United States Patent Office 3,637,710
Patented Jan. 25, 1972

3,637,710
4-(PHENYLIMINO)-1,4-DIHYDROQUINOLINE DERIVATIVES
Jan W. F. Wasley, Ossining, and Norbert Gruenfeld, Bronx, N.Y., assignors to Geigy Chemical Corporation, Greenburgh, N.Y.
No Drawing. Continuation-in-part of application Ser. No. 694,411, Dec. 29, 1967. This application May 26, 1969, Ser. No. 827,998
Int. Cl. C07d 33/48
U.S. Cl. 260—287 R
17 Claims

ABSTRACT OF THE DISCLOSURE

4-[(carboxyalkyl and carbalkoxyalkyl)phenylimino]-1,4-dihydroquinolines and derivatives thereof are anti-inflammatory and antimalarial agents which can be synthetically prepared by a number of routes. A typical embodiment is 7-chloro-4-[2-(carbomethoxymethyl)phenylimino]-1,4-dihydroquinoline.

CROSS REFERENCE

This is a continuation-in-part of copending application Ser. No. 694,411 filed Dec. 29, 1967, now abandoned.

DETAILED DESCRIPTION

The present invention pertains to compounds of the formula:

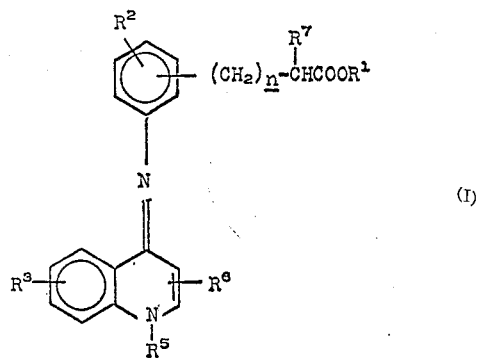

wherein
$R^1$ is hydrogen, (lower)alkyl, cycloalkyl of from 3 to 6 carbon atoms, hydroxy(lower)alkyl or dihydroxy(lower)alkyl;
each of $R^2$ and $R^3$, independent of the other, is hydrogen, chloro, fluoro, trifluoromethyl, (lower)alkyl or (lower)alkoxy;
$R^5$ is hydrogen, (lower)alkyl, benzyl, chlorobenzyl hydroxy or (lower)alkoxy;
$R^6$ is hydrogen, (lower)alkyl or phenyl;
$R^7$ is hydrogen or (lower)alkyl; and
$n$ has a value of 0 or 1.

Also embraced within the scope of the present invention are the pharmaceutically aceptable non-toxic acid addition salts of a compound of Formula I.

The present invention also pertains to valuable intermediates utilized in the synthesis of the compounds of Formula I to chemical processes for their preparation and to methods and compositions utilizing these compounds in the treatment of inflammatory and malarial conditions in warm blooded animals.

By the term "(lower)alkyl" and derivations thereof using the root "alk," such as "(lower)alkoxy" is intended a group comprising a branched or straight saturated hydrocarbon chain containing from one to six carbon atoms. Representative of (lower)alkyl groups are thus methyl, ethyl, propyl, isopropyl, butyl, sec-butyl, t-butyl, pentyl, isopentyl, hexyl and the like. Embraced by (lower)alkoxy are groups having a hydrocarbon chain of up to six carbon atoms and bound through oxygen ether bond. Typical of such are methoxy, ethoxy, isopropoxy, butoxy and the like. Cycloalkyl groups contain from 3 to 6 carbon atoms, i.e., cyclopropyl, cyclobutyl, cyclopentyl or cyclohexyl.

The 4 - [(carboxyalkyl and carbalkoxyalkyl)phenylimino]-1,4-dihydroquinolines of Formula I and their salts possess anti-inflammatory and anti-protozoal, in particular anti-malarial properties, which can be conveniently observed in standard pharmacological tests. For example, the anti-inflammatory activity of 7-chloro-4-[2-(carbomethoxymethyl)phenylimino]-1,4-dihydroquinoline is observed in the UV erythema test where in the guinea pig, at a dose of 100 mg./kg. p.o., it provides 80% protection. The antimalarial properties of these compounds appear to be comparable to chloroquine, inhibition of 98% and 72% being observed for the same compound in the imidazole-N-methyl transferase test at levels of $10^{-4}$ M and $10^{-5}$ M respectively. Toxicity is low, the oral $LD_{50}$ in mice for this compound being above 3000 mg./kg. The compounds are administered in daily dose levels of up to about 400 mg./kg., generally from about 5 to about 100 mg./kg., although in each instance the dosage should be carefully titrated to the condition being treated and the response desired, using in all instances sound professional judgment as the condition and age of the recipient may indicate.

The 4 - [(carboxyalkyl and carbalkoxyalkyl)phenylimino]-1,4-dihydroquinolines of the present invention are administered parenterally or orally to achieve an anti-inflammatory or anti-malarial effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitbaly comminuted, with a diluent or base such as starch, sucrose, kaolin, dicalcium phosphate and the like. The powder mixture can be granulated by wetting with a binder such as syrup, starch paste, acacia muciiage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the medicament in a non-toxic vehicle in which it is insoluble.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

One important embodiment of the present invention, particularly for preparing solid pharmaceutical formulations, is the pharmaceutically acceptable non-toxic acid addition salts of these 4-phenylimino-1,4-dihydroquinoline derivatives. Such pharmaceutcially acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and like acids.

Particularly preferred compounds of the present invention are those wherein $R^1$ is hydrogen or (lower)alkyl; $R^2$ is hydrogen; $R^3$ is chloro or trifluoromethyl in the 7-position of the quinoline ring; $R^5$ is hydrogen or hydroxy; $R^6$ is hydrogen or methyl; $R^7$ is hydrogen or methyl; and $n$ is 0.

The group

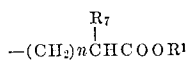

can be in the orthor, meta or para positions of the phenylimino ring, preferably ortho.

It will be appreciated that when $R^5$ is hydrogen or hydroxy, the compounds of the present invention can exist in or be depicted as being in the tautomeric 4-phenylaminoquinoline form, which is within the scope of the present invention.

The compounds of the present invention can be prepared in a number of ways. Briefly these include:

(a) condensing a compound of the formula:

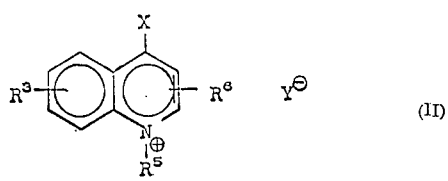

wherein X is chloro, bromo, iodo or phenoxy $Y^\ominus$ is a chloride, bromide, iodide, hydroxide, sulfate or p-toluenesulfate anion, and $R^3$, $R^5$ and $R^6$ are as defined for Formula I, with a compound of the formula:

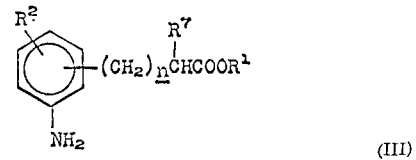

wherein $R^1$, $R^2$ and $R^7$ are as defined for Formula I;

(b) treating a nitrile of the formula:

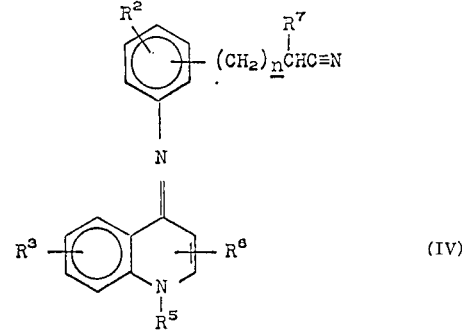

with (i) a lower alkanol or cycloalkanol in the presence of an acid catalyst to yield a compound of Formula I wherein $R^1$ is (lower)alkyl or cycloalkyl or (ii) with aqueous base or aqueous acid to yield a compound of Formula I wherein $R^1$ is hydrogen;

(c) oxidizing an alcohol of the formula:

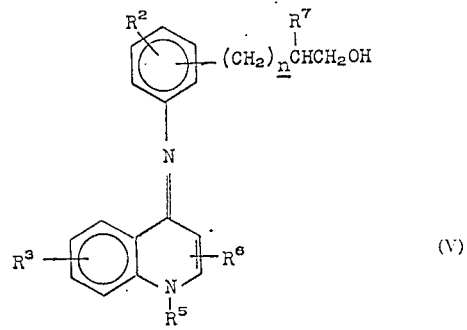

to yield a compound of Formula I wherein $R^1$ is hydrogen, (d) hydrolyzing a compound of Formula I wherein $R^1$ is (lower)alkyl or cycloalkyl with aqueous base to yield a compound of Formula I wherein $R^1$ is hydrogen and (e) esterifying a compound of Formula I wherein $R^1$ is hydrogen to yield a compound according to claim 1 wherein $R^1$ is (lower)alkyl or cycloalkyl.

In addition to the above five major processes can be mentioned the alkylation of a compound of Formula I wherein $R^5$ is hydrogen with an alkyl halide or benzyl halide to yield the corresponding N-alkyl or N-benzyl compound and the oxidation of a compound of Formula I where $R^5$ is hydrogen to the corresponding compound where $R^5$ is hydroxy, i.e., the N-oxide, optionally followed by alkylation with an alkylhalide to yield the compound of Formula I wherein $R^5$ is a (lower)alkoxy group.

In greater detail, the compounds of the present invention can be prepared according to a first process by condensing an appropriately substituted 4-halo- or 4-phenoxyquinoline of Formula II with an aminophenylalkanoic acid or ester of Formula III. The latter is thus allowed to react with at least a molar equivalent of the quinoline of Formula II, preferably a 4-chloroquinoline or a salt thereof, at temperatures of from about 50° to about 150° C., in an organic reaction medium such as benzene, dimethylformamide, dimethylsulfoxide, chloroform, acetone, acetonitrile and the like, or mixtures thereof, preferably acetonitrile and dimethylsulfoxide. This is conveniently accomplished by heating the mixture for a period of from about one hour to about 100 hours, e.g., about 3 hours. When the starting material is a 4-haloquinoline, the product is obtained in the form of the hydrohalide salt and can be isolated via conventional methods. When the hydrohalide salt remains in solution or precipitates only partially, the reaction product can be isolated as the free base via conventional methods, and then converted to an acid addition salt.

In the second process, a nitrile of Formula IV is subjected to solvolysis. This can be with a (lower)alkanol or cycloalkanol in the presence of an acid catalyst, in which case there is obtained a compound of Formula I wherein $R^1$ is (lower)alkyl or cycloalkyl, i.e., an ester, or under aqueous conditions in the presence of an acidic or basic catalyst, in which case there is obtained a compound of Formula I wherein $R^1$ is hydrogen, i.e., the free acid.

In the third process, an alcohol of Formula V is oxidized with conventional oxidizing agents such as potassium permanganate to yield the free acid, this oxidation passing through the intermediate aldehyde which is further oxidized to the final acid.

Both the nitriles of Formula IV and the alcohols of Formula V, as well as their salts, possess antiinflammatory activity in their own right, in addition to being valuable chemical intermediates. They are prepared analogously to the first process described for the final compounds, namely condensation of a 4-halo- or 4-phenoxyquinoline with an aminophenylalkylnitrile or aminophenylalkanol. In the case of the alcohols of Formula V, a (lower) alkanoate can be employed during the condensation with the alkanoyl group being hydrolyzed prior to oxidation.

In a fourth process, the compounds of Formula I wherein $R^1$ is hydrogen are prepared by saponification of the corresponding esters. Thus an ester of Formula I is treated with aqueous alkali such as sodium or potassium hydroxide at moderate temperatures of about 80 to 100° C. for about 30 minutes or longer, until saponification is completed. The aqueous base can advantageously contain 10 to 50% of a (lower) alkanol like methanol or ethanol to achieve better solution of the starting material. The product of the reaction precipitates out of the solution as the alkali salt and can be collected as such. The free zwitterionic product is precipitated by adding to the aqueous solution of the alkali salt, a mineral acid such as hydrochloride acid, sulfuric acid and the like, until a pH of about 5 is reached.

In a fifth process, the free acids of Formula I, namely those wherein $R^1$ is hydrogen, are esterified under conventional techniques to yield the corresponding esters, i.e., the compounds of Formula I wherein $R^1$ is (lower)alkyl or cycloalkyl. Thus for example the free acid and a (lower) alkanol or cycloalkanol are refluxed in the presence of an acid catalyst with removal of the water formed. other esterification methods known per se such as formation of the acid chloride and treatment of this with an alcohol, the reaction of a salt of the acid with an alkyl halide, the use of diazoalkanes or the like can also be used.

Those compounds of Formula I wherein $R^5$ is (lower) alkyl, benzyl or chlorobenzyl can also be prepared by alkylation of a compound of Formula I wherein $R^5$ is hydrogen with an alkyl or benzyl chloride, bromide, iodide, sulfate or p-toluenesulfonate in a ratio of about 1:1 to about 1:10, preferably about 1:3, an inert organic solvent such as benzene, toluene, xylene, chloroform, carbon tetrachloride, carbon disulfide, acetone, acetonitrile or the like, preferably acetonitrile, at temperatures of from about 50° to about 150° C., for about 1 hour to about 24 hours, e.g., about 2 hours. The desired product precipitates asan acid addition salt and the free base is obtained via conventional methods, e.g., addition of ammonia to the evaporated reaction mixtures.

Those compounds of Formula I wherein $R^5$ is hydroxy can also be prepared by treating a compound of Formula I wherein $R^5$ is hydrogen with a suitable oxidizing agent, preferably m-chloroperbenzoic acid in an inert organic solvent, preferably chloroform at temperatures of from about 20° C. to about 100° C. for about 10 minutes to about 24 hours, e.g., about 1 hour. The desired product can be isolated by conventional methods and then converted to an acid addition salt. The resulting N-oxide can in turn be alkylated as with an alkyl iodide to yield the corresponding N-alkoxides.

Compounds of Formula I wherein $R^1$ is a monohydroxyalkyl or dihydroxyalkyl group are generally synthesized through use of the tetrahydropyranyl or alkylidenedioxy protecting groups with subsequent acid hydrolysis to regenerate the free hydroxyalkyl or dihydroxyalkyl esters.

The following examples will further illustrate the present invention without limiting the scope thereof. Temperatures are in degrees centigrade.

EXAMPLE 1

7-chloro-4-[2-(carbomethoxymethyl)phenylimino]-1,4-dihydroquinoline

A mixture of 160 g. of 4,7-dichloroquinoline, 80 g. of methyl 2-aminophenylacetate and 500 ml. of acetonitrile is heated at reflux temperature for 24 hours. The solvent is evaporated under reduced pressure and the residue extracted 4 times with 750 ml. portions of hot water. The aqueous extract is rendered basic (pH 8) with 10% ammonium hydroxide whereupon 7-chloro-4-[2-(carbomethoxymethyl)phenylimino]-1,4-dihydroquinoline separates as an oil which crystallizes upon addition of ethanol. The product may be recrystallized from aqueous methanol, M.P. 147–8°.

*Analysis.*—Calc'd for $C_{18}H_{15}ClN_2O_2$ (percent): C, 66.10; H, 4.63; N, 8.57; Cl, 10.85. Found (percent): C, 65.97; H, 4.73; N, 8.84; Cl, 10.83.

The hydrochloride of 7-chloro-4-[2-(carbomethoxymethyl)phenylimino]-1,4-dihydroquinoline is prepared in conventional manner by treating a solution of the free base in ether with gaseous hydrochloric acid; M.P. 224–226°.

To a solution of 6 g. of 7-chloro-4-[2-(carbomethoxymethyl)phenylimino]-1,4-dihydroquinoline (Example 1) in 100 ml. of hot methanol is added 3 g. of methanesulfonic acid. The solution is cooled to room temperature and 750 ml. of ether is added. The product precipitates as off-white crystals and is collected by filtration. The methane sulfonate of the above-mentioned compound is recrystallized from methanol-ether, M.P. 179–181° C.

*Analysis.*—Calc'd for $C_{19}H_{19}ClN_2O_5S$ (percent): C, 53.96; H, 4.53; N, 6.63; Cl, 8.26; S, 7.58. Found (percent): C, 53.95; H, 4.59; N, 6.62; Cl, 8.26; S, 7.60.

EXAMPLE 2

7-chloro-4-[2-(carbomethoxymethyl)phenylimino]-1,4-dihydroquinoline

A mixture of 23.1 g. of 4,7-dichloroquinoline hydrochloride, 17.5 g. of methyl 2-aminophenylacetate and 250 ml. of acetonitrile is heated at reflux temperature for three hours. The solvent is evaporated under reduced pressure and the residue is extracted 3 times with 400 ml. portions of hot water. To the aqueous extract is added 50 ml. of ethanol and 10% ammonium hydroxide until pH 8 is reached. 7-chloro - 4 - [2-(carbomethoxymethyl)phenylimino]-1,4-dihydroquinoline separates and is recrystallized from aqueous methanol, M.P. 147–148°.

EXAMPLE 3

7-chloro-4-[5-trifluoromethyl-2-(carbomethoxymethyl) phenylimino]-1,4-dihydroquinoline A mixture of 30.1 g. of 4,7-dichloroquinoline, 17.7 g. of methyl 2-amino-4-trifluoromethylphenylacetate and 250 ml. of acetone is heated at reflux temperature for 72 hours. The solvent is evaporated under reduced pressure and the residue extracted three times with 500 ml. portions of hot water. To the aqueous extract is added 50 ml. of ethanol and 10% aqueous ammonium hydroxide until pH 8 is reached. The solid 7-chloro-4-[5-trifluoromethyl-2-(carbomethoxymethyl)phenylimino] - 1,4 - dihydroquinoline which separates is washed with hot petroleum-ether and recrystallized from aqueous ethanol, M.P. 198–200°.

*Analysis.*—Calc'd for $C_{19}H_{13}ClF_3N_2O_2$ (percent): C, 57.98; H, 3.33; N, 7.12; Cl, 9.01. Found (percent): C, 57.64; H, 3.37; N, 7.11; Cl, 9.01.

EXAMPLE 4

7-chloro-4-[2-(carboxymethyl)phenylimino]-1,4-dihydroquinoline

A mixture of 8.1 g. of 7-chloro-4-[2-(carbomethoxymethyl)phenylimino]-1,4-dihydroquinoline, 150 ml. of 1 N sodium hydroxide and 25 ml. of methanol is refluxed for 30 minutes. The methanol is distilled off, the aqueous solution is treated with charcoal, filtered and cooled to room temperature. In order to dissolve the sodium salt of the product, 150 ml. of water is added. Addition of 3 N hydrochloric acid until pH 5 is reached causes precipitation of 7 - chloro-4-[2-(carboxymethyl)phenylimino]-1,4-dihydroquinoline. The product is collected by filtration and washed well with water, ethanol and ether, M.P. 259–260°.

*Analysis.*—Calc'd for $C_{17}H_{13}ClN_2O_2$ (percent): C, 65.29; H, 4.19; N, 8.95; Cl, 11.34. Found (percent): C, 65.42; H, 4.01; N, 8.79; Cl, 11.45.

EXAMPLE 5

7-chloro-1-methyl-4-[2-(carbomethoxymethyl)phenylimino]-1,4-dihydroquinoline

A mixture of 7 g. of 7-chloro-4-[2-(carbomethoxymethyl)phenylimino]1,4-dihydroquinoline, 8 g. of methyliodide and 25 ml. of acetonitrile is refluxed for two hours. The solvent is evaporated under reduced pressure and the residue dissolved in a minimum of hot methanol. This solution is rendered basic with 10% ammonium hydroxide whereupon the 7-chloro - 1 - methyl-4-[2-(carbomethoxymethyl)-phenylimino]-1,4-dihydroquinoline precipitates, M.P. 131–133°.

*Analysis.*—Calc'd for $C_{19}H_{17}ClN_2O_2$ (percent): C, 66.92; H, 5.03; N, 8.22; Cl, 10.42. Found (percent): C, 66.77; H, 5.12; N, 8.26; Cl, 10.33.

EXAMPLE 6

7-chloro-4-[4-(carbomethoxymethyl)phenylimino]-1,4-dihydroquinoline

A mixture of 40 g. of 4,7-dichloroquinoline, 16.5 g. of methyl 4-aminophenylacetate and 250 ml. of acetonitrile is heated at reflux temperature for 15 hours. The solid which precipitates is collected by filtration and dissolved in a minimum of hot ethanol. This solution is rendered basic with 10% aqueous ammonium hydroxide. Upon addition of water 7-chloro-4-[4-(carbomethoxymethyl)phenylimino]1,4-dihydroquinoline precipitates, is collected by filtration and recrystallized from ethanol, M.P. 178–180°.

*Analysis.*—Calc'd. for $C_{18}H_{15}ClN_2O_2$ (percent): C, 65.97; H, 4.73; N, 8.84; Cl, 10.83. Found (percent): C, 66.19; H, 4.76; N, 8.66; Cl, 10.82.

The hydrochloride of 7-chloro-[4-carbomethoxymethyl)phenylimino]-1,4-dihydroquinoline is prepared in the conventional manner by treating a solution of the free base in methanol with gaseous hydrochloric acid, M.P. 247–249°.

EXAMPLE 7

7 - chloro-1-methyl-4-[4-carbomethoxymethyl)-phenylimino]-1,4-dihydroquinoline

A mixture of 12.7 g. of 7-chloro-4-[4-carbomethoxymethyl)phenylimino]-1,4-dihydroquinoline, 17 g. of methyl iodide and 250 ml. of acetonitrile is refluxed for 2 hours. The solvent is evaporated under reduced pressure and the residue dissolved in a minimum of hot ethanol. This solution is rendered basic with 10% ammonium hydroxide. The 7-chloro-1-methyl-4-[4-(carbomethoxymethyl)phenylimino] - 1,4 - dihydroquinoline precipitates and is recrystallized from aqueous ethanol, M.P. 155–157°.

*Analysis.*—Calc'd for $C_{19}H_{17}ClN_2O_2$ (percent): C, 66.92; H, 5.03; N, 8.22; Cl, 10.42. Found (percent): C, 67.21; H, 5.12; N, 8.35; Cl, 10.34.

EXAMPLE 8

7 - chloro - 4-[3-(carbomethoxymethyl)phenylimino]-1,4-dihydroquinoline

A mixture of 12 g. of 4,7-dichloroquinoline, 15 g. of methyl 3-aminophenylacetate and 250 ml. of acetonitrile is heated at reflux temperature for 2 hours. The solid which precipitates is collected by filtration and dissolved in hot ethanol. This solution is rendered basic with 10% aqueous ammonium hydroxide. Upon addition of water 7-chloro-4-[3 - (carbomethoxymethyl)phenylimino]-1,4-dihydroquinoline precipitates, is collected by filtration and recrystallized from aqueous ethanol, M.P. 138–140°.

*Analysis.*—Calc'd for: $C_{18}H_{15}ClN_2O_2$ (percent): C, 66.10; H, 4.63; N, 8.57; Cl, 10.85. Found (percent): C, 66.40; H, 4.67; N, 8.65; Cl, 10.87.

EXAMPLE 9

7 - chloro-1-methyl-4-[3-(carbomethoxymethyl)phenylimino]-1,4-dihydroquinoline 27.8 g. 7-chloro-4-[3-(carbomethoxymethyl)phenylimino]-1,4-dihydroquinoline prepared according to Example 8 were dissolved in 250 ml. of acetonitrile and then 36.3 g. of methyl iodide were added. The reaction mixture was heated under reflux for two hours during which time a yellow precipitate was formed. The precipitate was dissolved in a minimum of hot ethanol and the solution rendered basic with 10% ammonium hydroxide. On cooling, the desired compound crystallizes which on recrystallization from methanol yielded yellow needles having a melting point of 102–103°.

*Analysis.*—Calc'd for: $C_{19}H_{17}ClN_2O_2$ (percent): C, 66.92; H, 5.03; N, 8.22; Cl, 10.42. Found (percent): C, 66.90; H, 5.10; N, 8.14; Cl, 10.44.

EXAMPLE 10

7 - trifluoromethyl-4-[2-(carbomethoxymethyl)phenylimino]-1,4-dihydroquinoline

A mixture of 7.2 g. of 4-chloro-7-trifluoromethylquinoline, 5.4 g. of methyl 2-aminophenylacetate and 250 ml. of acetonitrile is heated under reflux for 18 hours. The solvent is evaporated under reduced pressure and the residue extracted 3 times with 200 ml. portions of hot water. The aqueous extract is rendered basic with 10% ammonium hydroxide whereupon the desired compound precipitated; it was recrystallized from aqueous ethanol yielding colorless needles with a melting point of 140–141°.

*Analysis.*—Calc'd for: $C_{19}H_{15}F_3N_2O_2$ (percent): C, 63.33; H, 4.19; N, 7.78; F, 15.82. Found (percent): C, 63.30; H, 4.45; N, 7.81; F, 15.90.

EXAMPLE 11

1 - methyl - 7-trifluoromethyl-4-[2-(carbomethoxymethyl)phenylimino]-1,4-dihydroquinoline A mixture of 300 mg. of 7-trifluoromethyl-4-[2-(carbomethoxymethyl)phenylimino]-1,4-dihydroquinoline (prepared according to Example 10), 2 g. of methyl iodide, and 25 ml. of acetonitrile are heated under reflux for 18 hours. The solvent is evaporated under reduced pressure; the residue dissolved in a minimum of hot ethanol and this solution rendered basic with 10% ammonium hydroxide. Crystallization is induced by the addition of water; the precipitate was collected by filtration and recrystallized from aqueous ethanol. Yellow needles having a melting point of 131–132° were obtained.

Analysis.—Calc'd for: $C_{20}H_{17}F_3N_2O_2$ (percent): C, 64.16; H, 4.58; N, 7.48; F, 15.23. Found (percent): C, 63.88; H, 4.96; N, 7.50; F, 15.29.

EXAMPLE 12

7 - chloro - 1-ethyl-4-[2-(carbomethoxymethyl)phenylimino]-1,4-dihydroquinoline

A mixture of 10 g. of 7-chloro-4-[2-(carbomethoxymethyl)phenylimino] - 1,4 - dihydroquinoline, (prepared according to Example 1), 15 g. of ethyl iodide, and 200 ml. of acetonitrile is heated under reflux for 4 hours. The solvent is evaporated under reduced pressure and the residue dissolved in a minimum of hot ethanol. The extract is rendered basic with 10% ammonium hydroxide. Crystallization of the desired compound is induced by adding water. After filtration, the compound is recrystallized from aqueous ethanol yielding yellow prisms with a melting point of 139–141°.

Analysis.—Calc'd for: $C_{20}H_{19}ClN_2O_2$ (percent): C, 67.69; H, 5.40; N, 7.90; Cl, 9.99. Found (percent): C, 67.45; H, 5.35; N, 7.89; Cl, 10.08.

EXAMPLE 13

2-methyl-7-chloro-4-[2-(carbomethoxymethyl) phenylimino]-1,4-dihydroquinoline

A mixture of 11 g. of 2-methyl-4,7-dichloroquinoline, 8 g. of methyl 2-aminophenylacetate, 220 ml. of acetonitrile and 25 ml. of dimethylsulfoxide is heated at reflux temperature for 18 hours. The solvent is evaporated under reduced pressure and the residue extracted 4 times with 300 ml. portions of hot water. The aqueous extract is rendered basic (pH 8) with 10% ammonium hydroxide whereupon 2 - methyl-7-chloro-4-[2-(carbomethoxymethyl)phenylimino]-1,4-dihydroquinoline separates as an oil. The oil is collected, dissolved in chloroform and dried over magnesium sulfate. The solvent is evaporated under reduced pressure and the residue dissolved in 5 ml. of chloroform and chromatographed on neutral alumina using chloroform as the eluent. The solvent is evaporated under reduced pressure and the residual yellow oil triturated with ethanol, whereupon the product crystallizes, M.P. 130–133°.

Analysis.—Calc'd for $C_{19}H_{17}ClN_2O_2$ (percent): C, 66.92; H, 5.03; N, 8.22; Cl, 10.42. Found (percent): C, 66.82; H, 5.07; N, 8.24; Cl, 10.49.

EXAMPLE 14

7-chloro-4-[2-(carboethoxymethyl)phenylimino]-1,4-dihydroquinoline

A mixture of 50 g. of 4,7-dichloroquinoline, 43 g. of ethyl 2-aminophenylacetate, 450 ml. of acetonitrile and 50 ml. of dimethylsulfoxide is heated at reflux temperature for 18 hours. The solvent is evaporated under reduced pressure and the residue extracted 4 times with 500 ml. portions of hot water. The aqueous extract is cooled to 40° and rendered basic to pH 8 with 10% ammonium hydroxide whereupon 7-chloro-4-[2-(carboethoxymethyl) phenylimino]-1,4-dihydroquinoline separates as an oil. The supernatant liquid is decanted and the oil dissolved in chloroform and dried over magnesium sulfate. The solvent is evaporated under reduced pressure and the residue dissolved in 10 ml. of chloroform and chromatographed on a neutral alumina column using chloroform as the eluent. The solvent is evaporated under reduced pressure leaving a yellow oil which crystallizes on standing. The product may be recrystallized from a mixture of ethanol and ether, M.P. 107–109°.

Analysis.—Calc'd for $C_{19}H_{17}ClN_2O_2$ (percent): C, 66.92; H, 5.03; N, 8.22; Cl, 10.42. Found (percent): C, 66.67; H, 5.32; N, 8.20; Cl, 10.43.

EXAMPLE 15

7-chloro-1-(4-chlorobenzyl)-4-[2-(carbomethoxymethyl)phenylimino]-1,4-dihydroquinoline A mixture of 10 g. of 7-chloro-4-[2-(carbomethoxymethyl)phenylimino] - 1,4 - dihydroquinoline, 15 g. of 4-chlorobenzyl chloride in 125 ml. of acetonitrile is heated at reflux temperature for 72 hours. On cooling to room temperature the hydrchloride salt of the product separates, is collected by filtration and is recrystallized from a mixture of methanol and ether, M.P. 231–232° C. The purified hydrochloride salt is dissolved in hot methanol and the solution rendered basic with 10% ammonium hydroxide whereupon 7-chloro - 1 - (4-chlorobenzyl)-4-[2-(carbomethoxymethyl)phenylimino] - 1,4 - dihydroquinoline crystallizes on cooling. The product is collected by filtration and may be recrystallized from aqueous methanol, M.P. 76.77° C.

Analysis.—Calc'd for $C_{25}H_{20}Cl_2N_2O_2$ (percent): C, 66.51; H, 4.47; N, 6.21; Cl, 15.72. Found (percent): C, 66.33; H, 4.42; N, 6.14; Cl, 16.02.

EXAMPLE 16

2-methyl-4-[2-(carbomethoxymethyl)phenylimino]-1,4-dihydroquinoline hydrochloride A mixture of 12.8 g. of 2-methyl-4-chloroquinoline, 0.5 ml. of concentrated hydrochloric acid and 100 ml. of acetonitrile is heated to 50° C. To the solution 13 g. of methyl 2-amino-phenylacetate is added. The reaction temperature is lowered to 45° C. and maintained at this temperature for 18 hours. The product separates and is collected by filtration and washed with acetonitrile. The product is recrystallized from a mixture of methanol and ether, M.P. 238–239° C.

Analysis.—Calc'd for $C_{19}H_{19}ClN_2O_2$ (percent): C, 66.56; H, 5.59; N, 8.17; Cl, 10.34. Found (percent): C, 66.60; H, 5.62; N, 8.32; Cl, 10.56.

EXAMPLE 17

7-chloro-4-[4-methoxy-2-(carbomethoxymethyl) phenylimino]-1,4-dihydroquinoline

A mixture of 30 g. of 4,7-dichloroquinoline, 1.5 ml. of concentrated hydrochloric acid and 100 ml. of acetonitrile is heated to 65° C. To the solution 25 g. of methyl 2-amino-5-methoxyphenylacetate is added. The reaction temperature is lowered to 45° C. and maintained at this temperature for 72 hours. The hydrochloride salt of the product separates and is collected by filtration. The hydrochloride salt is recrystallized from a mixture of methanol and acetone (1:4). The purified hydrochloride salt is dissolved in hot methanol and the solution rendered basic with 10% ammonium hydroxide whereupon 7-chloro-4-[4-methoxy - 2 - (carbomethoxymethyl)phenylimino]-1,4-dihydroquinoline crystallizes on cooling. The product is recrystallized from aqueous methanol, M.P. 156–157°.

Analysis.—Calc'd for $C_{19}H_{17}ClN_2O_3$ (percent): C, 63.94; H, 4.80; N, 7.85; Cl, 9.94. Found (percent): C, 63.67; H, 4.74; N, 7.81; Cl, 9.79.

EXAMPLE 18

7-chloro-1-methyl-4-[2-(carbomethoxymethyl)-4-methoxyphenylimino]-1,4-dihydroquinoline A mixture of 6.0 g. of 7 - chloro - 4 - [2 - carbomethoxymethyl) - 4 - methoxyphenylimino] - 1,4 - dihydroquinoline 7.1 g. of methyl iodide and 125 ml. of acetonitrile are combined and heated under reflux for 5 hours. The hydroiodide salt of the product crystallized out upon cooling and is collected by filtration. The salt is dissolved in hot methanol (75 ml.) and the solution is basified with 10% ammonium hydroxide. Upon cooling the product crystallized out, is collected by filtration and redissolved in methanol (50 ml.). Sufficient water is added to induce crystallization. The product is dissolved in a minimum of chloroform and chromatographed on a neutral alumina column using chloroform as the eluant. The chloroform solution is concentrated under reduced pressure and ether is added to induce crystallization. The product is recrystallized from chloroform ether, M.P. 136–137°.

*Analysis.*—Calc'd for $C_{20}H_{19}ClN_2O_3$ (percent): C, 64.77; H, 5.16; N, 7.56; Cl, 9.56. Found (percent): C, 64.77; H, 5.16; N, 7.75; Cl, 9.56.

EXAMPLE 19

7-chloro-4-[2-(carbobutoxymethyl)phenylimino)-1,4-dihydroquinoline hydrochloride (a) A mixture of 250 g. of 2-nitrophenylacetic acid, 500 ml. of n-butanol and 10 ml. of concentrated sulfuric acid is heated at reflux temperature for 18 hours. Upon cooling, the solution is diluted with 1000 ml. of water and is rendered basic with 10% ammonium hydroxide. The product separates as an oil which is extracted into 1000 ml. (2× 500 ml.) of ether. The combined ethereal extracts are washed well with water and the ether removed under reduced pressure to yield n-butyl 2-nitrophenylacetate, B.P. 119° C./0.15 mm.

(b) A mixture of 50.3 g. of butyl 2-nitrophenylacetate, 5 g. of 5% palladium on barium sulfate and 300 ml. of ethylacetate is hydrogenated at atmospheric pressure until 3 mole equivalents of hydrogen is absorbed. The catalyst is separated by filtration and the solvent is removed under reduced pressure to yield n-butyl 2-aminophenylacetate. This material is used without further purification.

(c) A mixture of 40 g. of 4,7-dichloroquinoline, 1.7 ml. of concentrated hydrochloric acid and 250 ml. of acetonitrile is heated to 65° C. To the solution 43.5 g. of n-butyl 2-aminophenylacetate is added. The reaction temperature is lowered to 45° C. and maintained at this temperature for 18 hours. 7 - chloro - 4 - [2 - carbobutoxymethyl)phenylimino]-1,4-dihydroquinoline hydrochloride separates and is collected by filtration and washed with acetonitrile. The product is recrystallized from a mixture of methanol and acetone, M.P. 167–168° C.

*Analysis.*—Calc'd for $C_{21}H_{22}Cl_2N_2O_2$ (percent): C, 62.22; H, 5.47; N, 6.91; Cl, 17.49. Found (percent): C, 61.97; H, 5.20; N, 7.01; Cl, 17.27.

EXAMPLE 20

7-chloro-4-[2-(carboisopropoxymethyl)phenylimino]-1,4-dihydroquinoline (a) A mixture of 250 g. of 2-nitrophenylacetic acid, 500 ml. of isopropanol and 10 ml. of concentrated sulfuric acid is heated at reflux temperature for 18 hours. Upon cooling, the solution is diluted with 1000 ml. of water and is rendered basic with 10% ammonium hydroxide. The product separates as an oil which is extracted into 1000 ml. (2× 500 ml.) of ether. The combined ethereal extracts are washed well with water and the ether is removed under reduced pressure to yield isopropyl 2-nitrophenylacetate, B.P. 107° C./0.19 mm.

(b) A mixture of 50.0 g. of isopropyl 2-nitrophenylacetate, 5.5 g. of 5% palladium on barium sulfate and 500 ml. of ethyl acetate is hydrogenated at atmospheric pressure until 3 mole equivalents of hydrogen is absorbed. The catalyst is separated by filtration and the solvent removed under reduced pressure to yield isopropyl 2-aminophenylacetate. This material is used without further purification.

(c) A mixture of 41.5 g. of 4,7-dichloroquinoline, 1.89 ml. of concentrated hydrochloric acid and 500 ml. of acetonitrile is heated to 65° C. To the solution 44 g. of isopropyl 2-aminophenylacetate is added. The reaction temperature is lowered to 45° C. and maintained at this temperature for 18 hours. The hydrochloride salt of the product separates and is collected by filtration and washed with acetonitrile. The hydrochloride salt is recrystallized from a mixture of methanol and acetone, M.P. 187–9° C.

13 g. of the purified hydrochloride salt is dissolved in hot methanol and the solution rendered basic with 10% ammonium hydroxide. Sufficient water is added to induce the 7 - chloro - 4 - [2 - (carboisopropoxymethyl)phenylimino] - 1,4 - dihydroquinoline to crystallize. The product is collected by filtration and is recrystallized from aqueous methanol, M.P. 93–94° C.

*Analysis.*—Calc'd for $C_{19}H_{20}ClN_2O_2$ (percent): C, 67.69; H, 5.40; N, 7.90; Cl, 9.99. Found (percent): C, 67.61; H, 5.49; N, 7.87; Cl, 9.98.

EXAMPLE 21

7-chloro-4-[2,($\beta$,$\gamma$-isopropylidenedioxypropoxycarbonylmethyl)phenylimino]1,4-dihydroquinoline (a) 50 mg. of sodium is dissolved in 31.7 g. of isopropylidene glycerol and 47 g. of 2-nitrophenylacetic acid added. The reaction is heated at 125° C. for 5 hours under an atmosphere of nitrogen and then cooled and poured into 200 ml. of water. The solution is extracted with 500 ml. (2× 250 ml.) of ether. The ethereal extracts are dried over magnesium sulfate and the solvent removed under reduced pressure to yield isopropylideneglyceryl 2-nitrophenylacetate, B.P. 145–148° C./0.07 mm.

(b) A mixture of 9 g. of isopropylidene glyceryl 2-nitrophenylacetate, 1 g. of 5% palladium on barium sulfate and 125 ml. of ethyl acetate is hydrogenated at atmospheric pressure until 3 mole equivalents of hydrogen is absorbed. The catalyst is separated by filtration and the solvent removed under reduced pressure to yield isopropylideneglyceryl 2-aminophenylacetate. This material is used without further purification.

(c) A mixture of 25.7 g. of 4,7-dichloroquinoline, 0.4 ml. of concentrated hydrochloric acid and 300 ml. of acetonitrile is heated to 65° C. To the solution is added 43.3 g. of $\beta$,$\gamma$-isopropylidene glyceryl 2-aminophenylacetate. The reaction temperature is lowered to 45° C. and maintained at this temperature for 18 hours. On cooling to room temperature, the hydrochloride salt of the product separates and is collected by filtration. The hydrochloride salt is dissolved in hot methanol and the solution rendered basic with 10% ammonium hydroxide. The product precipitates as a tacky solid on the addition of ether, and is collected by filtration and recrystallized from a mixture of methanol and ether, M.P. 56–57° C.

*Analysis.*—Calc'd for $C_{23}H_{23}ClN_2O_4$ (percent): N, 6.57; Cl, 8.30. Found (percent): N, 6.66; Cl, 8.08.

EXAMPLE 22

7-chloro-4-[2-($\beta$,$\gamma$-dihydroxypropoxycarbonylmethyl)phenylimino]-1,4-dihydroquinoline 50 mg. of sodium is dissolved in 150 ml. of isopropylidene glycerol and 6.9 g. of 7-chloro-4-[2-(carbomethoxymethyl)phenylimino]-1,4-dihydroquinoline added. The reaction is heated to 125° C. for 3 hours under a nitrogen atmosphere, and then cooled and poured into ice-water. The aqueous phase is extracted with chloroform and the combined chloroform extracts are dried over magnesium sulfate and the chloroform removed under reduced pressure to yield a yellow oil. The oil is dissolved in a minimum of chloroform and chromatographed on a neutral alumina column using chloroform as an eluant. The chloroform is removed under reduced pressure to yield an oil which is heated with 2 N hydrochloric acid for 10 minutes. The aqueous solution was rendered basic with 10% ammonium hydroxide and extracted with chloroform. The chloroform extracts are dried over magnesium sulfate and the chloroform removed under reduced pressure to yield an oil which crystallizes on trituration with petrol-ether and is collected by filtration, M.P. 157–159° C.

*Analysis.*—Calc'd for $C_{20}H_{19}ClN_2O_4$ (percent): C, 62.09; H, 4.95; N, 7.24; Cl, 9.16. Found (percent): C, 61.91; H, 4.94; N, 7.22; Cl, 9.19.

EXAMPLE 23

6-methoxy-4-[2-(carbomethoxymethyl)phenylimino]-1,4-dihydroquinoline hydrochloride A mixture of 9 g. of 4-chloro-6-methoxyquinoline, 0.39 ml. of concentrated hydrochloric acid and 100 ml. of acetonitrile is heated to 65° C. To the solution 7.7 g. of methyl 2-aminophenylacetate is added. The reaction temperature is lowered to 4° C. and maintained at this temperature for 18 hours. The hydrochloride salt of 6-methoxy - 4- [2 - (carbomethoxymethyl)phenylimino]-1,4-dihydroquinoline separates and is collected by filtration. The product is recrystallized from a mixture of methanol and acetone, M.P. 225–226° C.

Analysis.—Calc'd for $C_{19}H_{19}ClN_2O_3$ (percent): C, 63.59; H, 5.34; N, 7.81; Cl 9.88. Found (percent): C, 63.50; H, 5.20; N, 7.86; Cl, 9.82.

EXAMPLE 24

6-methyl-4-[2-(carbomethoxymethyl)phenylimino]-1,4-dihydroquinoline hydrochloride A mixture of 12.4 g. of 4-chloro-6-methyl-quinoline, 0.5 ml. of concentrated hydrochloric acid and 500 ml. of acetonitrile is heated to 50° C. To the solution 13 g. of methyl 2-aminophenylacetate is added and the reaction temperature is lowered to 45° C. and maintained at this temperature for 2 hours. The hydrochloride of 6-methyl-4-[2-(carbomethoxymethyl)phenylimino] - 1,4 - dihydroquinoline separates and is collected by filtration. The product is recrystallized from a mixture of methanol and acetone, M.P. 138–139° C.

Analysis.—Calc'd for $C_{19}H_{19}ClN_2N_2$ (percent): C, 66.56; H, 5.59; N, 8.17; Cl, 10.34. Found (percent): C, 66.75; H, 5.28; N, 8.29; Cl, 10.46.

EXAMPLE 25

8-trifluoromethyl-4-[2-(carbomethoxymethyl)phenylimino]-1,4-dihydroquinoline

A mixture of 39.3 g. of 4-chloro-8-trifluoromethyl-quinoline, 1.4 ml. of concentrated hydrochloric acid and 250 ml. of acetonitrile is heated to 65° C. To the solution is added 27.8 g. of methyl 2-aminophenylacetate. The reaction temperature is lowered to 45° C. and maintained at this temperature for 18 hours. The hydrochloride salt of 8 - trifluoromethyl-4-[2-(carbomethoxymethyl)phenylimino]-1,4-dihydroquinoline separates and is collected by filtration and washed with acetonitrile. The hydrochloride salt is dissolved in hot methanol and the solution rendered basic with 10% ammonium hydroxide. Sufficient water is added to precipitae the desired compound which is collected by filtration and is recrystallized from a mixture of methanol and ether, M.P. 163–164° C.

Analysis.—Calc'd for $C_{19}H_{15}F_3N_2O_2$ (percent): C, 63.33; H, 4.19; N, 7.78; F, 15.82. Found (percent): C, 63.20; H, 4.29; N, 7.71; F, 15.93.

EXAMPLE 26

7-chloro-3-methyl-4-[2-(carbomethoxymethyl)phenylimino]-1,4-dihydroquinoline

A mixture of 14.3 g. of 4,7-dichloro-3-methylquinoline, 0.55 ml. of concentrated hydrochloric acid and 100 ml. of acetonitrile is heated to 65° C. To the solution 16 g. of methyl 2-aminophenylacetate is added. The reaction temperature is lowered at 45° C. and maintained at this temperature for 18 hours. The hydrochloride salt of 7 - chloro-3-methyl-4-[2 - (carbomethoxymethyl)phenylimino] - 1,4 - dihydroquinoline separates and is collected by filtration. The hydrochloride salt is dissolved in chloroform and the solution rendered basic with 10% ammonium hydroxide. The chloroform solution is dried over sodium sulfate and concentrated to small volume under reduced pressure. The solution is then chromatographed on a neutral alumina column using chloroform as the eluant. The solvent is then removed under reduced pressure and the product may be recrystallized from chloroform, M.P. 230–232° C.

EXAMPLE 27

7-chloro-4-[3-(carbomethoxymethyl)phenylamino]-quinoline-1-oxide

A solution of 15 g. of 7-chloro-4-[3-(carbomethoxymethyl)phenylimino] - 1,4 - dihydroquinoline (Example 8) in 200 ml. of chloroform is added to a solution of 10 g. of m-chloroperbenzoic acid in 300 ml. of chloroform. The solution is then heated under reflux for 15 minutes. This reaction mixture is cooled to room temperature and the solution is extracted with 5% sodium bicarbonate (2× 250 ml.), washed with water (3× 250 ml.) and dried over magnesium sulfate. The chloroform solution is concentrated under reduced pressure to about 25 ml. and chromatographed on a neutral alumina column using a 10/90 mixture methanol and chloroform as the eluant. The chloroform is evaporated to dryness and the residue is recrystallized from aqueous methanol, M.P. 207–208° C.

Analysis.—Calc'd for $C_{18}H_{15}ClN_2O_3$ (percent): C, 63.03; H, 4.43; N, 8.19; Cl, 10.37. Found (percent): C, 62.75; H, 4.58; N, 8.17; Cl, 10.60.

EXAMPLE 28

7-chloro-4-[2-(carboxymethyl)phenylimino]1,4-dihydroquinoline

A mixture of 13.2 g. (0.66 mole) of 4.7-dichloroquinoline, 10 g. (0.066 mole) of 2-aminophenylacetic acid, 0.55 ml. (0.0066 mole) of concentrated hydrochloric acid and 50 ml. of dimethyl sulfoxide is heated at 70° C. for 4 hours. The reaction mixture is treated with 300 ml. of water and the insoluble solid collected by filtration and washed with 20 ml. of water. The filtrate is diluted with 150 ml. of acetone and the solution is adjusted to pH 5 with 22 ml. 3 N sodium hydroxide causing the product to precipitate. The product is collected by filtration and washed with water and acetone, M.P. 259–260° C.

EXAMPLE 29

7-chloro-4-[2-(carbocyclohexyloxymethyl)phenylimino]-1,4-dihydroquinoline (a) A mixture of 200 g. of 2-nitrophenylacetic acid, 500 ml. of cyclohexanol, and 20 ml. of sulfuric acid are combined and heated under reflux for 18 hours. The mixture is diluted with ether 500 ml. washed with 1% ammonium hydroxide and then washed thoroughly with water (3× 1000 ml.). The ethereal solution is dried over magnesium sulfate and the ether is removed under reduced pressure to yield an amber oil. The oil is distilled under vacuum to yield the product as a pale yellow oil; B.P. 165–168° C./0.15 mm.

(b) A mixture of 50.0 g. of cyclohexyl 2-nitrophenylacetate, 5 g. of 5% palladium on barium sulfate and 500 ml. of ethyl acetate are combined and hydrogenated at atmospheric pressure until 3 mole equivalents of hydrogen are absorbed. The catalyst is collected by filtration and the ethyl acetate is evaporated off under reduced pressure. The residue is used immediately in the next step.

(c) A mixture of 40 g. of 4,7-dichloroquinoline, 1.0 ml. of concentrated hydrochloric acid, and 500 ml. of acetonitrile are combined and heated to 65° C., and 44.3 g. of cyclohexyl 2-aminophenylacetate is added and the temperature is lowered to 45° C. The mixture is maintained at this temperature for 18 hours. During this time the color of the solution changed to a deep red and the hydrochloride of the salt separated as an oil. The mother liquids are decanted and the oil is dissolved in hot methanol (200 ml.) and ether 1000 ml. was added. Upon scratching the salt crystallized and is collected by filtration. The salt is dissolved in hot methanol (200 ml.) and the solution is rendered basic with 10% ammonium hydroxide. Water is added and the product separated as an oil. The mother liquids are decanted and the oil is dissolved in chloroform and the chloroform solution is washed with water, and dried over magnesium sulfate. The solution is concentrated to about 50 ml. under reduced pressure and the residue is chromatographed on a neutral alumina column using chloroform as the eluant. The chloroform is removed under reduced pressure and the residue is recrystallized twice from methanol, M.P. 101–102° C.

EXAMPLE 30

2-methyl-7-chloro-4-[2-(carbomethoxymethyl)phenylamino]quinoline-1-oxide

A mixture of 5.2 g. of 7-chloro-4-[2-(carbomethoxymethyl)phenylimino]-1,4-dihydroquinaldine in 75 ml. of chloroform is added to a mixture of 75 ml. of chloroform and 3.2 g. of 80% m-chloroperbenzoic acid. The color of the solution immediately turned a greenish-yellow. The solution is then heated under reflux on a steam bath for 15 minutes and during this time the color of the solution changed to a deep reddish-yellow. The reaction mixture is cooled to room temperature and the solution is extracted with 5% sodium bicarbonate (2× 200 ml.), washed with water (4× 150 ml.) and dried over magnesium sulfate. The chloroform solution is concentrated under reduced pressure to about 25 ml. and chromatographed on a neutral alumina column using a 10/90 mixture of methanolchloroform as the eluant. The chloroform is evaporated to dryness under reduced pressure and the residue is recrystallized twice from methanol-ether, M.P. 208–209° C.

*Analysis.* — Calc'd for $C_{19}H_{17}ClN_2O_3$ (percent): C, 63.95; H, 4.80; N, 7.85; Cl, 9.94. Found (percent): C, 63.67; H, 4.93; N, 7.87; Cl, 9.92.

EXAMPLE 31

7-chloro-4-[2-(carbomethoxymethyl)phenylamino]-quinoline-1-oxide

A solution of 10 g. of 7-chloro-4-[2-(carbomethoxymethyl)phenylamino]-1,4-dihydroquinoline (Example 1) in 100 ml. of chloroform is added to a mixture of 150 ml. of chloroform and 4.5 g. of 85% m-chloroperbenzoic acid. The color of the solution immediately turned a greenish-yellow. The solution is then heated under reflux on a steam bath for 15 minutes and during this time the color of the solution changed to a deep reddish-yellow. The reaction mixture is then cooled to room temperature and the solution is extracted with sodium bicarbonate 250 ml. washed with water (4× 250 ml.) and dried over magnesium sulfate. The chloroform is removed under reduced pressure and the residue is dissolved in a minimum of hot ethanol. The ethanol solution is then added to a large volume of petroleum ether (circa 2L) and stirred for 18 hours; the product crystallized on the walls of the flask. This procedure is repeated once more to yield a yellow powder, M.P. 204–205° C.

U.V. Adsorption shows λmax at 388 mμ which is characteristic of quinoline-1-oxides.

*Analysis.* — Calc'd for $C_{18}H_{15}ClN_2O_3$ (percent): C, 63.03; H, 4.43; N, 8.19; C, 10.37. Found (percent): C, 62.86; H, 4.68; N, 8.23; C, 10.22.

EXAMPLE 32

6-chloro-2-phenyl-4-[4-(carboxymethyl)phenylimino]-1,4-dihydroquinoline (a) 4,6-dichloro-2-phenylquinoline is prepared by the procedure as described by Fuson, R. C., and Burness, D. M., J.A.C.S., vol. 68, p. 1270 (1946).

(b) A mixture of 13.7 g. of 4,6-dichloro-2-phenylquinoline, 8.25 g. of methyl 4-aminophenylacetate and 250 ml. of 2 N hydrochloric acid are combined and heated under reflux for 18 hours. During this time the color of the mixture turned to a yellow-orange and a solid crystallized. The solid is collected by filtration and washed thoroughly with ether. The hydrochloride salt of the product is added to hot methanol and the solution is rendered neutral (pH 7) with 10% ammonium hydroxide. The product crystallized immediately and is collected by filtration and washed with water.

EXAMPLE 33

7-chloro-4-[2-carbomethoxymethyl)phenylamino]-quinoline-1-oxide hydrochloride

A solution of 15.1 g. of 7-chloro-4-[2-(carbomethoxymethyl(phenylamino]-quinoline-1-oxide (Example 31) in 250 ml. of chloroform is treated with anhydrous hydrogen chloride gas. The solution is then diluted with ether (200 ml.) and upon scratching the hydrochloride salt crystallized out.The salt is collected by filtration and washed thoroughly with ether. The hydrochloride salt is dissolved in hot methanol (150 ml.) and ether (1000 ml.) is added in portions. The product crystallized out as yellow crystals and is washed with ether, M.P. 220–222° C.

*Analysis.* — Calc'd for $C_{18}H_{16}Cl_2N_2O_3$ (percent): C, 57.00; H, 4.25; N, 7.39; Cl, 18.70. Found (percent): C, 56.99; H, 4.04; N, 7.41; Cl, 18.43.

EXAMPLE 34

1-methoxy-7-trifluoromethyl-4-[2-(carbomethoxymethyl)phenylimino]-1,4-dihydroquinoline A mixture of 2.3 g. of 7-trifluoromethyl-4-[2-(carbomethoxymethyl)phenylamino]quinoline-1-oxide, 4.6 g. of methyl iodide, and 100 ml. of acetonitrile are heated under reflux for 2½ hours. The solvent is evaporated under reduced pressure; the residue is dissolved in 50 ml. of chloroform and the solution rendered basic with 10% ammonium hydroxide. The solution is dried over sodium sulfate and chromatographed on neutral alumina using chloroform as the eluent. The solvent is evaporated under reduced pressure; a red oil is obtained. The oil is dissolved in about 10 ml. of methanol and reprecipitated by the addition of about 5 ml. of water (cloud point). The desired compound is obtained after recrystallization from aqueous methanol as bright yellow prisms, M.P. 84°.

EXAMPLE 35

7-chloro-4-[2-(β-carbomethoxyethyl)phenylimino]-1,4-dihydroquinoline

A mixture of 14 g. (0.07 mole) of 4,7-dichloroquinoline, 0.6 ml. of concentrated hydrochloric acid and 75 ml. of acetonitrile is heated to 65° C. To the solution is added 14.3 g. of methyl β-(2-aminophenyl)-propionate and the reaction temperature is lowered to 45° C. and is maintained at this temperature for 18 hours. The hydrochloride salt of the product precipitates and is collected by filtration and recrystallized from methanolacetone. The purified hydrochloride salt is dissolved in hot methanol and the solution is rendered basic pH 8 with 10% ammonium hydroxide whereupon 7-chloro-4-[2-(β-carbomethoxyethyl)phenylimino]-1,4-dihydroquinoline crystallizes. The product may be recrystallized from aqueous methanol, M.P. 136–138°.

EXAMPLE 36

7-trifluoromethyl-4-[2-(carbomethoxymethyl)phenylamino]-quinoline-1-oxide

A solution of 13.4 g. of 7-trifluoromethyl-4-[2-carbomethoxymethyl)phenylimino] - 1,4 - dihydroquinoline (Example 10) in 250 ml. of chloroform is added to a mixture of 200 ml. of chloroform and 10.2 g. of 85% m-chloroperbenzoic acid. The solution is then heated under reflux for 40 minutes. The reaction mixture is cooled to room temperature and the solution is extracted with 5% sodium bicarbonate (3× 500 ml.), washed with water (2× 500 ml.) and dried over magnesium sulfate. The chloroform solution is concentrated under reduced pressure to about 25 ml. and chromatographed on a neutral alumina column using a 10/90 mixture of methanol-chloroform as the eluant. The chloroform is evaporated to dryness under reduced pressure and the residue is recrystallized from a mixture of acetone and methanol, M.P. 209–11° C.

EXAMPLE 37

7-chloro-4-[2-(carbomethoxy)phenylimino]-1,4-dihydroquinoline (A) A mixture of 10 g. of 4,7-dichloroquinoline, 1 ml. of concentrated hydrochloric acid and 150 ml. of acetonitrile is heated to 65° C. To the solution is added 5 g. of 2-amino-benzyl cyanide. The reaction temperature is lowered to 45° C. and maintained at this temperature for 72 hours. The hydrochloride salt of 7-chloro-4-[2-cyanomethyl)phenylimino] - 1,4 - dihydroquinoline separates and is collected by filtration. The hydrochloride salt is dissolved in hot methanol and the solution rendered basic with 10% ammonium hydroxide. Sufficient water is added to precipitate 7-chloro-4-[2-(cyanomethyl)phenylimino]-1,4-dihydroquinoline which is collected by filtration and may be recrystallized from aqueous methanol, M.P. 201–202° C.

*Analysis.*—Calc'd for $C_{17}H_{12}ClN_3$ (percent): C, 69.51; H, 4.12; N, 14.31; Cl, 12.07. Found (percent): C, 70.04; H, 4.05; N, 14.26; Cl, 11.76.

In a similar fashion there is obtained 7-trifluoro-methyl-4 - [2-(cyanomethyl)phenylimino]-1,4-dihydroquinoline, HCl, M.P. 167–169° C. and 7-chloro-4-[2-(cyanomethyl)phenylimino]-1,4-dihydroquinoline-1-oxide, M.P. 207–208° C.

(B) A mixture of 100 mg. of 7-chloro-4-[2-(cyanomethyl)phenylimino]-1,4-dihydroquinoline, 1.5 ml. of concentrated sulfuric acid and 10 ml. of absolute methanol is heated at reflux temperature for 3 hours. The methanol is removed by distillation and the reaction mixture is diluted with water and the solution rendered basic with 10% ammonium hydroxide causing a tacky solid to precipitate. This product is recrystallized from aqueous methanol. 7 - Chloro - 4-[2-(carbomethmethyl)phenylimino]-1,4-dihydroquinoline is obtained, M.P. 147–8° C.

7 - trifluoromethyl-4-[2-(carbomethoxymethyl)phenylimino]-1,4-dihydroquinoline, M.P. 140–141° C. and 7-chloro - 4 - [2 - (carbomethoxymethyl)phenylimino]-1,4-dihydroquinoline-1-oxide, M.P. 204–205° C. are obtained in a similar fashion from the corresponding nitriles.

Utilization of ethanol and butanol in place of methanol yields 7 - chloro-4-[2-(carbethoxymethyl)phenylimino] 1,4-dihydroquinoline, M.P. 107–109° C. and 7-chloro-4-[2 - (carbobutoxymethyl)phenylimino] - 1,4 - dihydroquinoline, M.P. 167–168° C. (as the hydrochloride).

EXAMPLE 38

7-chloro-4-[2-(carbomethoxymethyl)phenylimino]-1,4-dihydroquinoline hydrochloride (A) A mixture of 14.5 g. of 4,7-dichloroquinoline, 200 ml. of acetonitrile, 0.6 ml. of concentrated hydrochloric acid and 15 g. of 2-o-aminophenylethyl alcohol is heated at 65° C. for 3 hours. The hydrochloride salt of 7-chloro-4 - [2 - (β-hydroxyethyl)phenylimino]-1,4-dihydroquinoline separates, is collected by filtration and recrystallized from a mixture of methanol and acetone, M.P. 295–6° C. (decomp.).

*Analysis.*—Calc'd for $C_{17}H_{16}Cl_2N_2O$ (percent): Cl, 21.15; N, 8.31. Found (percent): Cl, 21.01; N, 8.23.

In a similar fashion there are obtained from the corresponding 4-chloroquinolines the following compounds:

(a) 7 - trifluoromethyl - 4-[2-(β-hydroxyethyl)phenylimino]-1,4-dihydroquinoline, M.P. 27–228° C.

(b) 7 - chloro - 4 - [2-(β-hydroxyethyl)phenylimino]-1,4-dihydroquinoline-1-oxide, M.P. 220–222° C.

(c) 2 - methyl-7-chloro-4-[2-(β-hydroxyethyl)phenylimino]-1,4-dihydroquinoline, M.P. 219–221° C.

(d) 1 methyl - 7 - trifluoromethyl-4-[2-(β-hydroxyethyl)phenylimino - 1,4 - dihydroquinoline, M.P. 145–147° C.

(B) A mixture of 3.4 g. of 7-chloro-4-[2-(β-hydroxyethyl)phenylimino]-1,4-dihydroquinoline, 70 ml. of water and 0.65 g. of concentrated sulfuric acid is cooled in an ice bath. 2.1 g. of powdered potassium permanganate is added over a period of 2 hours while the reaction temperature is maintained at 50° C. After the addition is complete the reaction is held at 50° C. until the purple color of the potassium permanganate is discharged. The reaction is then heated to 80° C. and filtered. The filtrate is evaporated to dryness under reduced pressure to yield 7 - chloro - 4 - [2-(carboxymethyl)phenylimino]-1,4-dihydroquinoline which when purified through conventional means (such as extraction with aqueous base and subsequent acidification) melts at 259–260° C. but which can be used directly in the following procedure without further purification. The residue thus obtained is heated under reflux with methanolic hydrogen chloride for 4 hours. The solution is diluted with 500 ml. of water and the solution rendered basic with 10% ammonium hydroxide. The solution is extracted with 300 ml. (2× 150 ml.) of chloroform. The chloroform extracts are dried over sodium sulfate, concentrated to small volume under reduced pressure and chromatographed on a neutral alumina column using chloroform as the eluant. The solvent is removed under reduced pressure and the residue is recrystallized from aqueous methanol. The obtained 7-chloro - 4-[2-(carbomethoxymethyl)phenylimino]-1,4-dihydroquinoline melts at 147–148° C.

In a similar fashion there is obtained from 7-trifluoromethyl-4-[2-(β-hydroxyethyl)penylimino] - 1,4 - dihydroquinoline and 7-chloro - 4 - [2-(β-hydroxyethyl)phenylimino]-1,4-dihydroquinoline-1-oxide, upon isolation of the acids 7-trifluoromethyl - 4 - [2 - carboxymethyl)phenylimino]-1,4-dihydroquinoline, M.P. 254–255° C. which is converted to the methyl ester, M.P. 140–141° C. and 7-chloro-4-[2 - (carboxymethyl)phenylimino]-1,4-dihydroquinoline-1-oxide, M.P. 248–249° C. which is converted to the methyl ester as herein described, M.P. 204–205° C.

Similarly, but without purification of the free acid, from 2-methyl-7-chloro-4-[2 - (β-hydroxyethyl)phenylimino]-1,4-dihydroquinoline and 1 - methyl-7-trifluoromethyl-4-[2 - (β-hydroxyethyl)phenylimino]-1,4-dihydroquinoline there is obtained according to this procedure 2-methyl-7-chloro-4-[2 - (carbomethoxymethyl)phenylimino]-1,4-dihydroquinoline, M.P. 130–133° C. and 1-methyl-7-trifluoromethyl-4-[2 - (carbomethoxymethyl)phenylimino]-1,4-dihydroquinoline, M.P. 131–132° C.

(C) The β-hydoxyethyl intermediates of Part A can alternatively be prepared as follows:

To a mixture of 31.8 g. of 4,7-dichloroquinoline, 1.2 ml. of conc. hydrochloric acid and 250 ml. of acetonitrile at 45° C. are slowly added 28.8 g. of o-aminophenenethyl acetate (prepared by catalytic hydrogenation of o-nitrophenethyl acetate). The mixture is stirred for four hours at 45° C. and the solid which forms collected. This material is dissolved in hot methanol rendered basic with 10% aqueous ammonia. Upon addition of water, the product crystallizes. It is collected, chromatographed on neutral alumina, using chloroform as the eluant. The chromatographed solution is reduced in volume to about 50 ml. and treated with ether to yield 7-chloro-4-[2-(β-acetoxyethyl)phenylimino] - 1,4 - dihydroquinoline, M.P. 166–168° C.

In a similar fashion there is obtained:

7-trifluoromethyl - 4 - [2 - (β-acetoxymethyl)phenylimino]-1,4-dihydroquinoline, M.P. 202–203° C.

7-chloro - 4 - [2-(β-acetoxymethyl)phenylimino]-1,4-dihydroquinoline-1-oxide, M.P. 199–200° C., 2-methyl - 7 - chloro - 4 - [2-(β-acetoxyethyl)phenylimino]-1,4-dihydroquinoline, M.P. 162–164° C.

1 - methyl-7-trifluoromethyl-4-[2-(β-acetoxyethyl)phenylimino]-1,4-dihydroquinoline, M.P. 167–168° C.

These acetates are then hydrolysed to the corresponding alcohols, described in part A of this example, as follows: To a solution of 100 ml. of methanol and 450 ml. of 2 N sodium hydroxide are added 16.5 g. of 7-chloro-4-[2-(β-acetoxyethyl)phenylimino]-1,4 - dihydroquinoline. The mixture is heated at reflux for four hours. The solid which forms is collected, washed with water and recrystallized twice from methanol-chloroform, M.P. 195–196° C.

EXAMPLE 39

7-chloro-4-[2-(α-carbomethoxyethyl)phenylimino]-1,4-dihydroquinoline

To a mixture of 19.4 g. of 4,7-dichloroquinoline, 0.8 ml. of conc. hydrochloric acid and 150 ml. of acetonitrile, heated to 60° C. is slowly added a solution of 14.4 g. of 2-amino-α-methylphenylacetonitrile in 100 ml. of acetonitrile. The mixture is heated at 50° C. for 18 hours and the solid which forms is collected by filtration, washed with acetonitrile and recrystallized twice from methanol-acetone to yield 7-chloro - 4 - [2-(α-cyanoethyl)phenylimino]-1,4-dihydroquinoline hydrochloride, M.P. 256–257° C. Treatment of this nitrile with methanol and concentrated sulfuric acid in the manner described in Example 37, part B, then yields 7-chloro-4-[2-(α-carbomethoxyethyl)phenylimino]-1,4-dihydroquinoline which as the hydrochloride salt melts at 213–214° C.

The 2 - amino-α-methylphenylacetonitrile can be obtained by alkylation of 2-nitrobenzylcyanide with methyl iodide in the presence of potassium carbonate to yield 2-nitro-α-methylphenylacetonitrile which is then hydrogenated with 5% palladium-on-barium sulfate catalyst.

EXAMPLE 40

7-chloro-4-[2-(carbomethoxymethyl)phenylimino]-1,4-dihydroquinoline

One gram of 7 - chloro-4-[2-(carboxymethyl)phenylimino]-1,4-dihydroquinoline and 100 ml. of 2.2 N methanolic hydrogen chloride are allowed to stand for 15 hours at room temperature. The solution is filtered and the solvent evaporated under reduced pressure to yield the ester as the hydrochloride salt which after recrystallization from methanol-acetone melts at 221–225° C.

The free base is obtained by treating a methanolic solution of the hydrochloride with 10% aqueous ammonia. After collection and recrystallization from aqueous methanol, the free base demonstrates a melting point of 147–148° C.

In a similar fashion the following compounds are subjected to the foregoing procedure:
(a) 7-chloro - 4 - [2-(carboxymethyl)phenylimino]-1,4-dihydroquinoline-1-oxide, M.P. 248–249° C.
(b) 1-methyl - 7 - chloro-4-[2-carboxymethyl)phenylimino]-1,4-dihydroquinoline, M.P. 155–156° C.
(c) 2-methyl - 4 - [2-(carboxymethyl)phenylimino]-1,4-dihydroquinoline, M.P. 207–208° C.
(d) 7-trifluoromethyl - 4 - [2-(carboxymethyl)phenylimino]-1,4-dihydroquinoline, M.P. 254–255° C.
(e) 8-trifluoromethyl - 4-[2 - (carboxymethyl)phenylimino]-1,4-dihydroquinoline, M.P. 177–180° C. with softening at 138–145° C.

There are thus respectively obtained:
(a) 7-chloro - 4 - [2-(carbomethoxymethyl)phenylimino]-1,4-dihydroquinoline-1-oxide, M.P. 204–205° C.
(b) 1-methyl - 7 - chloro-4-[2-(carbomethoxymethyl)-phenylimino]-1,4-dihydroquinoline, M.P. 131–133° C.
(c) 2-methyl - 4 - [2-(carbomethoxymethyl)phenylimino]-1,4-dihydroquinoline, M.P. 130–133° C.
(d) 7-trifluoromethyl - 4 - [2-(carbomethoxymethyl)-phenylimino]-1,4-dihydroquinoline, M.P. 140–141° C.
(e) 8-trifluoromethyl - 4 - [2-(carbomethoxymethyl)-phenylimino]-1,4-dihydroquinoline, M.P. 163–164° C.

EXAMPLE 41

7-chloro-4-[2-(carboxymethyl)phenylimino]-1,4-dihydroquinoline

A mixture of 0.5 g. of 7-chloro-4-[2-(cyanomethyl)-phenylimino]-1,4-dihydroquinoline, 2 ml. of conc. sulfuric acid and 50 ml. of water is heated at reflux for 18 hours. The solution is clarified with charcoal, filtered and neutralized with 10% aqueous ammonia. The solid which forms is collected by filtration, washed with water, and suspended in saturated sodium bicarbonate solution and warmed. The insoluble material is removed by filtration and the filtrate neutralized with 2 N hydrochloric acid. The solid is collected, washed with water and dried to yield the indicated free acid, M.P. 254–255° C. which upon purification melts at 259–260° C.

Similarly from 7-trifluoromethyl-4-[2-(cyanomethyl)-phenylimino]-1,4-dihydroquinoline, M.P. 167–169° C. and 7-chloro-4-[2-(cyanomethyl)phenylimino]-1,4-dihydroquinoline-1-oxide, M.P. 207–208° C., there is obtained according to this procedure 7-trifluoromethyl-4-[2-(carboxymethyl)phenylimino] - 1,4 - dihydroquinoline, M.P. 254–255° C. and 7-chloro-4-[2-(carboxymethyl)phenylimino]-1,4-dihydroquinoline-1-oxide, M.P. 248–249° C.

EXAMPLE 42

7-chloro-4-[4-(carbomethoxymethyl)phenylamino]-quinoline-1-oxide 4,7-dichloroquinoline-1-oxide (10.7 g., 0.05 mole), methyl 4-aminophenyl acetate (14.1 g. 0.085 mole), absolute ethanol (250 ml.) and concentrated hydrochloric acid (0.2 ml.) are combined and heated under reflux for 3 hours. The reaction mixture is then allowed to stir at room temperature for 72 hours. The hydrochloride salt which forms is collected and washed with acetonitrile. The solid is dissolved in hot methanol (50 ml.) and the solution rendered basic with 10% ammonium hydroxide solution. The resulting oil is decanted, washed with water and extracted into chloroform. The chloroform solution is dried over magnesium sulfate, concentrated under reduced pressure to about 25 ml. and chromatographed on a neutral alumina column using a 10/90 mixture of methanol-chloroform as the eluant. The solvent is evaporated to dryness under reduced pressure, the residue is dissolved in methanol and sufficient water is added to induce crystallization. The product is recrystallized twice from aqueous methanol to yield 7-chloro-4-[4-(carbomethoxymethyl)phenylamino]-quinoline-1-oxide, M.P. 218–219° C.

What is claimed is:
1. A compound of the formula:

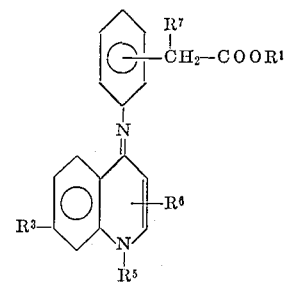

wherein $R^1$ is hydrogen or (lower)alkyl;
$R^3$ is chloro or trifluoromethyl;
$R^5$ is hydrogen, methyl or hydroxy;
$R^6$ is hydrogen or methyl; and
$R^7$ is hydrogen or methyl.

2. The pharmaceutically acceptable nontoxic acid addition salts of a compound according to claim 1.

3. A compound according to claim 1 wherein the group

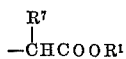

is in the ortho position of the phenylimino ring.

4. A compound according to claim 1 wherein the group

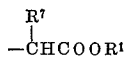

is in the meta position of the phenylimino ring.

5. A compound according to claim 1 wherein the group

is in the para position of the phenylimino ring.

6. A compound according to claim 1 which is 7-chloro-4-[2-(carbomethoxymethyl)phenylimino]-1,4-dihydroquinoline.

7. A compound according to claim 1 which is 7-chloro-4-[2-(carboxymethyl)phenylimino]-1,4-dihydroquinoline.

8. A compound according to claim 1 which is 7-trifluoromethyl-4-[2-(carbomethoxymethyl)phenylimino]-1,4-dihydroquinoline.

9. A compound according to claim 1 which is 2-methyl-4-[2-(carbomethoxymethyl)phenylimino]-1,4-dihydroquinoline.

10. A compound according to claim 1 which is 7-chloro-4-[2-(carbobutoxymethyl)phenylimino]-1,4-dihydroquinoline.

11. A compound according to claim 1 which is 7-chloro-4-[2-(carboisopropoxymethyl)phenylimino]-1,4-dihydroquinoline.

12. A compound according to claim 1 which is 7-chloro-4-[2-(carbomethoxymethyl)phenylamino]quinoline-1-oxide.

13. A compound according to claim 1 which is 2-methyl-7-chloro-4-[2-(carbomethoxymethyl)phenylimino]-1,4-dihydroquinoline.

14. A compound according to claim 1 which is 7-chloro-4-[2-(carbethoxymethyl)phenylimino]-1,4-dihydroquinoline.

15. A compound according to claim 1 which is 7-trifluoromethyl-4-[2-(carbomethoxymethyl)phenylamino]-quinoline-1-oxide.

16. A compound according to claim 1, which is 7-trifluoromethyl-4-[2-(carboxymethyl)phenylimino]-1,4-dihydroquinoline.

17. Pharmaceutically acceptable non-toxic acid addition salts of the compound according to claim 1.

References Cited

UNITED STATES PATENTS

| | | | |
|---|---|---|---|
| 2,858,314 | 10/1958 | Georgian | 260—287 |
| 3,075,981 | 1/1963 | Surrey | 260—287 X |
| 3,132,145 | 5/1964 | Allais et al. | 260—286 |
| 3,150,047 | 9/1964 | Allais et al. | 424—258 |
| 3,151,026 | 9/1964 | Allais et al. | 424—528 |
| 3,174,972 | 3/1965 | Allais et al. | 260—287 |
| 3,463,780 | 8/1969 | Allais e tal. | 260—287 |

DONALD G. DAUS, Primary Examiner

U.S. Cl. X.R.

260—283 CN, 286 Q, 286 R, 288 R, 465 E, 471 R, 515 R, 518 R, 518 N; 424—258

GC-299 CIP II

PO-1050
(5/69)

UNITED STATES PATENT OFFICE
CERTIFICATE OF CORRECTION

Patent No. 3,637,710      Dated January 25, 1972

Inventor(s) JAN W.F. WASLEY ET AL

It is certified that error appears in the above-identified patent and that said Letters Patent are hereby corrected as shown below:

Column 1, line 5, delete "Geigy Chemical Corporation, Greenburgh, N. Y." and insert -- CIBA-GEIGY CORPORATION, ARDSLEY, N.Y. --;

Column 22, line 17, "claim 1" should read -- claim 16 --.

Signed and sealed this 9th day of July 1974.

(SEAL)
Attest:

McCOY M. GIBSON, JR.      C. MARSHALL DANN
Attesting Officer      Commissioner of Patents df